United States Patent
Mimura et al.

(10) Patent No.: US 12,313,312 B2
(45) Date of Patent: May 27, 2025

(54) REFRIGERATION DEVICE AND OIL COOLING DEVICE

(71) Applicant: DAIKIN INDUSTRIES, LTD., Osaka (JP)

(72) Inventors: Takuya Mimura, Osaka (JP); Junpei Yamamoto, Osaka (JP); Hitoshi Niinuma, Yuki (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 223 days.

(21) Appl. No.: 17/628,064

(22) PCT Filed: May 19, 2020

(86) PCT No.: PCT/JP2020/019789
§ 371 (c)(1),
(2) Date: Jan. 18, 2022

(87) PCT Pub. No.: WO2021/014723
PCT Pub. Date: Jan. 28, 2021

(65) Prior Publication Data
US 2022/0260290 A1 Aug. 18, 2022

(30) Foreign Application Priority Data

Jul. 19, 2019 (JP) ................................. 2019-133557
Jul. 19, 2019 (JP) ................................. 2019-133561

(51) Int. Cl.
*F25B 43/02* (2006.01)
(52) U.S. Cl.
CPC .................................... *F25B 43/02* (2013.01)
(58) Field of Classification Search
CPC ............................. F25B 43/02; B01D 46/52
See application file for complete search history.

(56) References Cited

U.S. PATENT DOCUMENTS

| 5,733,349 | A | 3/1998 | Wu |
| 2016/0273554 | A1* | 9/2016 | Kim .................... B60H 1/00521 |

FOREIGN PATENT DOCUMENTS

| CN | 208302476 | U | * | 1/2019 |
| JP | 4-15470 | A | | 1/1992 |
| JP | 4-103536 | A | | 9/1992 |
| JP | 5-39976 | A | | 2/1993 |

(Continued)

OTHER PUBLICATIONS

Yanagida et al. (JP 20044332962 A), English Translation, Cooling Storage, 2004, Whole Document (Year: 2004).*
Kobayashi (JP H07260289 A), English Translation, Filter Device for Condenser for Freezer, 1995, Whole Document (Year: 1995).*
Terashita et al. (JP 2015068522 A), English Translation, Filter Device for Liquid Cooling Device, and Liquid Cooling Device, 2015, Whole Document (Year: 2015).*

(Continued)

*Primary Examiner* — Larry L Furdge
*Assistant Examiner* — Keith Stanley Myers
(74) *Attorney, Agent, or Firm* — GLOBAL IP COUNSELORS, LLP

(57) ABSTRACT

A refrigeration apparatus includes a refrigerant circuit having a heat exchanger, a housing that houses at least the heat exchanger and is provided with a suction port on an upstream side of the heat exchanger, and a filter attached to the suction port of the housing. The filter is configured to be held not to come into contact with the heat exchanger. When air containing oil mist flows to the heat exchanger via the filter, at least a part of an oil component in the air containing oil mist is trapped by the filter.

12 Claims, 13 Drawing Sheets

(56) References Cited

FOREIGN PATENT DOCUMENTS

| JP | 5-28408 Y | 7/1993 |
|---|---|---|
| JP | 5-203209 A | 8/1993 |
| JP | 5-94679 U | 12/1993 |
| JP | 7-260289 A | 10/1995 |
| JP | H8-22363 B2 | 3/1996 |
| JP | 2002-318059 A | 10/2002 |
| JP | 2003-83562 A | 3/2003 |
| JP | 2003-336958 A | 11/2003 |
| JP | 2004-332962 A | 11/2004 |
| JP | 2007-105645 A | 4/2007 |
| JP | 2015-68522 A | 4/2015 |
| JP | 2015-68524 A | 4/2015 |
| JP | 2018-69152 A | 5/2018 |
| JP | 2018-185064 A | 11/2018 |
| JP | 2019-935 A | 1/2019 |
| JP | 2019-34397 A | 3/2019 |
| KR | 2006-0130365 A | 12/2006 |
| WO | 2006/051739 A1 | 5/2006 |

OTHER PUBLICATIONS

Lin et al. (CN208302476U), English Translation, 2019, Whole Document (Year: 2019).*
International Search Report of corresponding PCT Application No. PCT/JP2020/019789 dated Aug. 4, 2020.
European Search Report of corresponding EP Application No. 20 84 4733,4 dated Jul. 21, 2022.
International Preliminary Report of corresponding PCT Application No. PCT/JP2020/019789 dated Feb. 3, 2022.

* cited by examiner

REFRIGERATION DEVICE AND OIL COOLING DEVICE

CROSS-REFERENCE TO RELATED APPLICATIONS

This U.S. National stage application claims priority under 35 U.S.C. § 119 (a) to Japanese Patent Application Nos. 2019-133557 and 2019-133561 filed in Japan on Jul. 19, 2019, the entire contents of which are hereby incorporated herein by reference.

BACKGROUND

Field of the Invention

The present disclosure relates to refrigeration apparatuses and an oil cooling apparatuses using the refrigeration apparatus.

Background Information

Conventionally, there have been oil cooling apparatuses for cooling oil used for cooling main shafts or motors of machine tools (see, e.g., Japanese Patent Application Laid-Open No. 2019-34397).

The oil cooling apparatus includes a refrigerant circuit having a condenser and an evaporator, in which oil is cooled by the evaporator and heat is discharged outside from the condenser.

SUMMARY

Since the conventional oil cooling apparatus is used in the same installation space as the machine tool, air containing oil mist is sucked in via a filter and supplied to the condenser, and an oil component and dust adhere to the condenser, thereby causing clogging.

In order to clean such a clogged condenser, it is necessary to remove the condenser from the oil cooling apparatus. Therefore, there arise problems that: it takes a long time to remove, clean, and attach the condenser and the cost of the maintenance work increases; and the shutdown period of the machine tool also increases, which decreases operation rate.

The present disclosure proposes a refrigeration apparatus capable of suppressing clogging of a heat exchanger in an oil mist atmosphere, and an oil cooling apparatus using the refrigeration apparatus.

A refrigeration apparatus of the present disclosure includes:
 a refrigerant circuit having a heat exchanger;
 a housing that houses at least the heat exchanger and is provided with a suction port on an upstream side of the heat exchanger; and
 a filter attached to the suction port of the housing and having a filter material bent in a bellows shape, in which
 when air containing oil mist is supplied to the heat exchanger via the filter, at least a part of an oil component in the air containing oil mist is trapped by the filter.

According to the present disclosure, the filter attached to the suction port of the housing has the filter material bent in a bellows shape, so that the surface area of the filter becomes larger than that of a filter having a flat shaped filter material. Therefore, when air containing oil mist is supplied to the heat exchanger via the filter, the filter having the filter material with a large surface area can hold a lot of oil components, which extends a lifetime (a time until the filter is clogged).

In addition, the refrigeration apparatus according to one aspect of the present disclosure includes
 an oil reservoir disposed below a space between the heat exchanger and the filter,
 an oil receiver and an oil reservoir separate from the oil receiver, the oil reservoir disposed below a space between the heat exchanger and the filter, or
 an oil receiver and an oil reservoir integrally formed on the oil receiver, the oil reservoir disposed below a space between the heat exchanger and the filter.

According to the present disclosure, an oil component trapped by the filter flows downward and an oil component adhering to the front surface side of the heat exchanger flows downward. The oil components that have flowed down are received by the oil receiver provided below the space between the heat exchanger and the filter. The oil received by the oil receiver is stored in the oil reservoir. As a result, the oil components adhering to the filter and the heat exchanger can be stored in the oil reservoir and collectively treated without contaminating the surroundings with the oil.

In addition, the refrigeration apparatus according to one aspect of the present disclosure, when including the oil receiver and the oil reservoir separate from the oil receiver, includes a guide path that guides the oil from the oil receiver to the oil reservoir.

According to the present disclosure, the oil received by the oil receiver is guided to the oil reservoir by the guide path, so that the oil can be stored in the oil reservoir without contaminating the surroundings with the oil.

In addition, in the refrigeration apparatus according to one aspect of the present disclosure,
 a plurality of plate-shaped fins of the heat exchanger is disposed in parallel to each other and extends along a vertical direction.

According to the present disclosure, the oil component adhering to the front surface side of the heat exchanger smoothly flows downward, so that clogging, occurring due to oil droplets remaining between the fins, can be effectively suppressed.

In addition, in the refrigeration apparatus according to one aspect of the present disclosure,
 the filter is configured to guide oil droplets adhering to a surface of the filter downward.

According to the present disclosure, an oil component that has adhered to the filter smoothly flows downward, so that clogging, occurring due to oil droplets remaining in the filter, can be effectively suppressed.

In addition, in the refrigeration apparatus according to one aspect of the present disclosure,
 the filter is attached to the suction port of the housing such that creases of the filter are directed in the vertical direction.

According to the present disclosure, an oil component that has adhered to the filter smoothly flows downward, so that clogging, occurring due to oil droplets remaining in the filter, can be effectively suppressed.

In addition, in the refrigeration apparatus according to one aspect of the present disclosure,
 the filter is attached at an interval from the heat exchanger.

According to the present disclosure, even when air containing oil mist is supplied to the heat exchanger via the filter and an oil component in the air is trapped by the filter, the oil component trapped by the filter cannot easily be transmitted to the heat exchanger side, so that clogging of the heat exchanger can be suppressed.

In addition, an oil cooling apparatus of the present disclosure includes any one of the refrigeration apparatuses, in which
the heat exchanger is a first heat exchanger functioning as a condenser,
the refrigerant circuit of the refrigeration apparatus has a second heat exchanger functioning as an evaporator, and
the oil is cooled by the second heat exchanger.

According to the present disclosure, an oil cooling apparatus, capable of suppressing clogging of the first heat exchanger functioning as a condenser in an oil mist atmosphere, can be realized.

A refrigeration apparatus of the present disclosure includes:
a refrigerant circuit having a heat exchanger;
a housing that houses at least the heat exchanger and is provided with a suction port on an upstream side of the heat exchanger; and
a filter attached to the suction port of the housing, in which
the filter is configured to be held not to come into contact with the heat exchanger, and
when air containing oil mist is supplied to the heat exchanger via the filter, at least a part of an oil component in the air containing oil mist is trapped by the filter.

According to the present disclosure, the filter is configured to be held not to come into contact with the heat exchanger, so that an oil component trapped by the filter cannot easily be transmitted to the heat exchanger side, even when air containing oil mist is supplied to the heat exchanger via the filter and an oil component in the air is trapped by the filter. As a result, clogging of the heat exchanger can be suppressed.

In addition, the refrigeration apparatus according to one aspect of the present disclosure includes an attachment frame for attaching the filter to the housing, in which
a lower frame portion of the attachment frame is inclined toward the heat exchanger side and downward.

According to the present disclosure, oil droplets that have adhered to the surface of the filter and flowed downward can be collected into a lower portion on the heat exchanger side along the inclination of the lower frame portion of the attachment frame. The oil droplets can be treated together with oil droplets that have adhered to the heat exchanger and flowed downward.

DETAILED DESCRIPTION OF EMBODIMENT(S)

Figure 1:
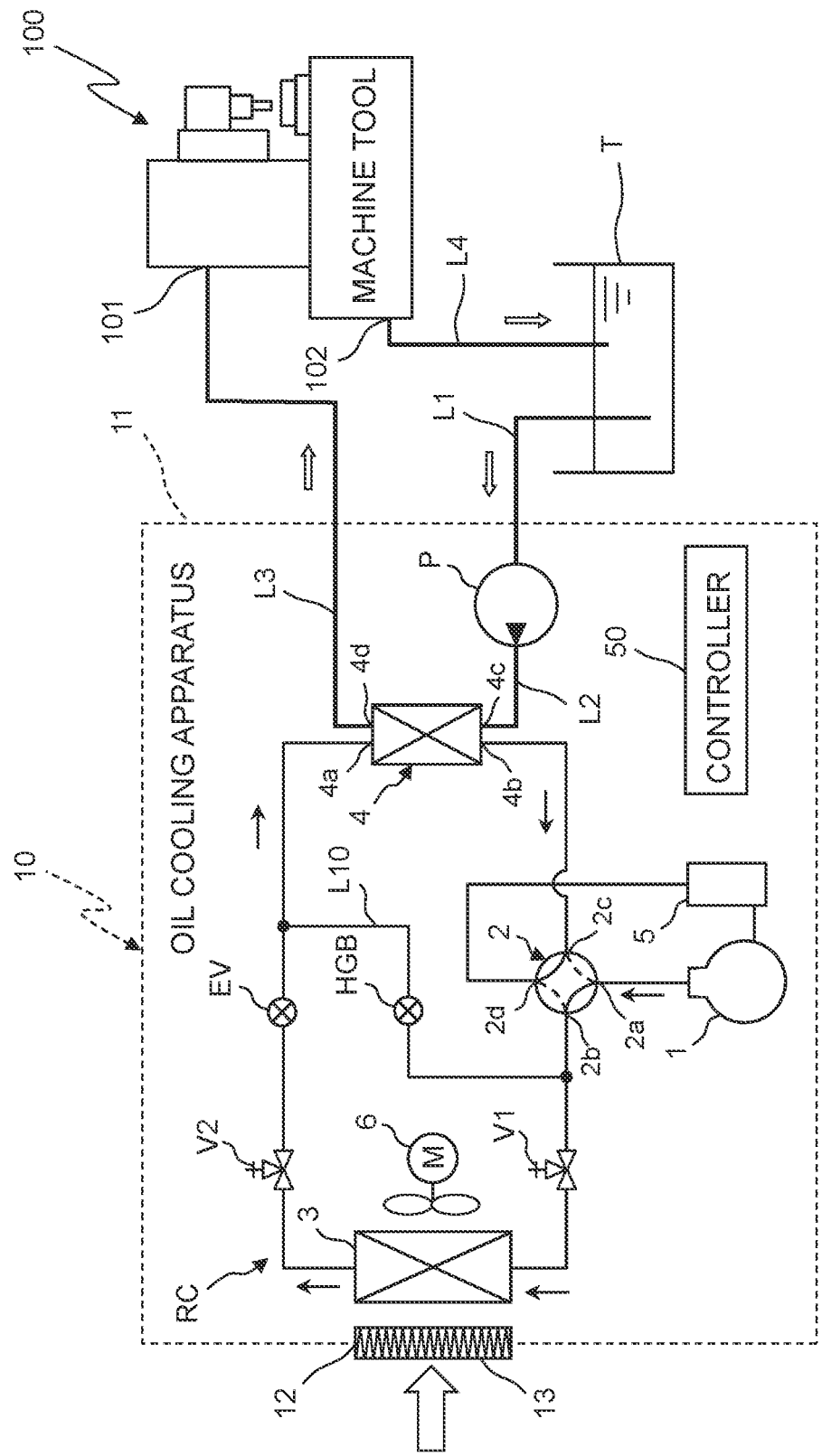
FIG. 1 is a schematic configuration view of an oil cooling apparatus using a refrigeration apparatus according to a first embodiment of the present disclosure.

Hereinafter, embodiments will be described. Note that in the drawings, the same reference numerals denote the same or corresponding parts. In addition, the dimensions on the drawings, such as lengths, widths, thicknesses, and depths, are appropriately changed from actual scales for clarity and simplification of the drawings, and do not represent actual relative dimensions.

First Embodiment

FIG. 1 is a schematic configuration view of an oil cooling apparatus 10 using a refrigeration apparatus according to a first embodiment of the present disclosure. The oil cooling apparatus 10 cools hydraulic oil, lubricating oil, or cutting fluid (hereinafter referred to as "oil") for a machine tool 100, while circulating the same via an oil tank T. The machine tool 100 is an industrial machine such as: a machine tool such as an NC lathe, a grinding machine, or an NC dedicated machine; a molding machine; or a press machine.

As illustrated in FIG. 1, the oil cooling apparatus 10 according to the first embodiment includes a refrigerant circuit RC, a four-way switching valve 2, a fan 6, and a controller 50. A compressor 1, a condenser 3, an electronic expansion valve EV, and an evaporator 4 are annularly connected in the refrigerant circuit RC. The four-way switching valve 2 switches a refrigerant circulation direction in the refrigerant circuit RC from a forward cycle to a reverse cycle. The fan 6 supplies air to the condenser 3. The controller 50 controls the refrigerant circuit RC, the four-way switching valve 2, and the fan 6. The electronic expansion valve EV is one example of a decompression mechanism. In addition, the refrigerant circuit RC has a hot gas bypass pipe L10 and a hot gas bypass valve HGB disposed in the hot gas bypass pipe L10.

The condenser 3 is one example of a first heat exchanger, and the evaporator 4 is one example of a second heat exchanger.

The discharge side of the compressor 1 is connected to a first port 2a of the four-way switching valve 2. A second port 2b of the four-way switching valve 2 is connected to one end of the condenser 3 via a shut-off valve V1. The other end of the condenser 3 is connected to one end of the electronic expansion valve EV via a shut-off valve V2.

In addition, the other end of the electronic expansion valve EV is connected to one end 4a of the evaporator 4. In addition, the other end 4b of the evaporator 4 is connected to a third port 2c of the four-way switching valve 2. Furthermore, a fourth port 2d of the four-way switching valve 2 is connected to the suction side of the compressor 1 via an accumulator 5. In addition, one end of the hot gas bypass pipe L10 is connected to the one end 4a side of the evaporator 4. The other end of the hot gas bypass pipe L10 is connected to the second port 2b side of the four-way switching valve 2.

In addition, the other end of a pipe L1 whose one end is immersed in the oil in the oil tank T is connected to the suction port of a circulation pump P. The discharge port of the circulation pump P is connected to an inflow port 4c of the evaporator 4 via a pipe L2.

In addition, one end of a pipe L3 is connected to an outflow port 4d of the evaporator 4, and the other end of the pipe L3 is connected to an inflow port 101 of the machine tool 100. An outflow port 102 of the machine tool 100 and the oil tank T are connected via a pipe L4.

The oil tank T, the evaporator 4, the machine tool 100, and the pipes L1 to L4 constitute a circulation path through which the oil circulates.

The oil cooling apparatus 10 and the circulation path constitute an oil cooling system. Note that in the first embodiment, the oil cooling apparatus 10 includes the circulation pump P; however, it may be configured such that a circulation pump is provided separately from an oil cooling apparatus and the oil cooling apparatus, the circulation pump, and the circulation path constitute an oil cooling system.

In the oil cooling apparatus 10, after a refrigerant is recovered into the evaporator 4 by a pump down operation, the condenser 3 is removed from a housing 11 to clean the condenser 3. In the pump down operation, the coil of the four-way switching valve 2 is excited to switch the refrigerant circulation direction in the refrigerant circuit to a reverse cycle.

Figure 2:
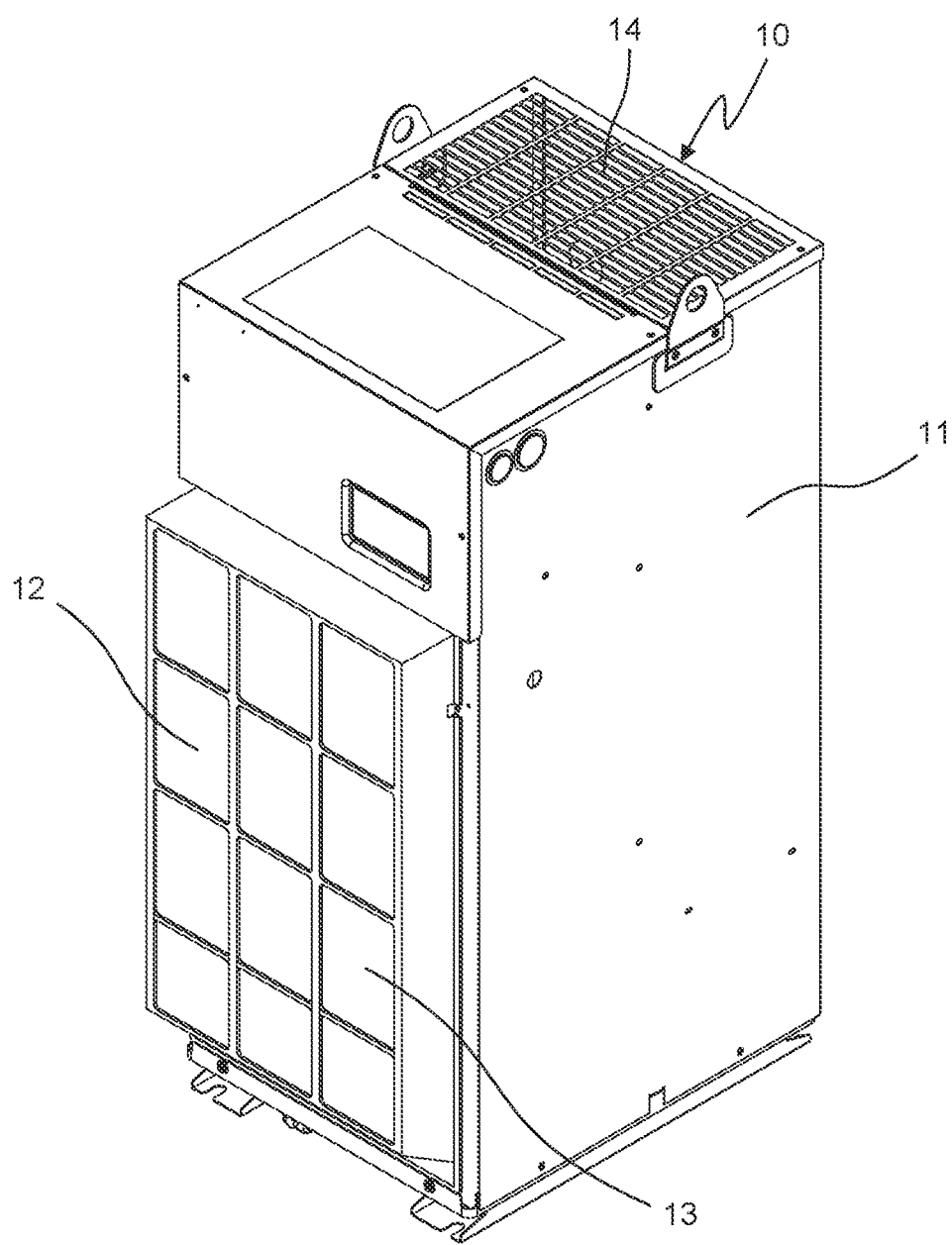
FIG. 2 is a perspective view of the oil cooling apparatus according to the first embodiment.
Figure 3:
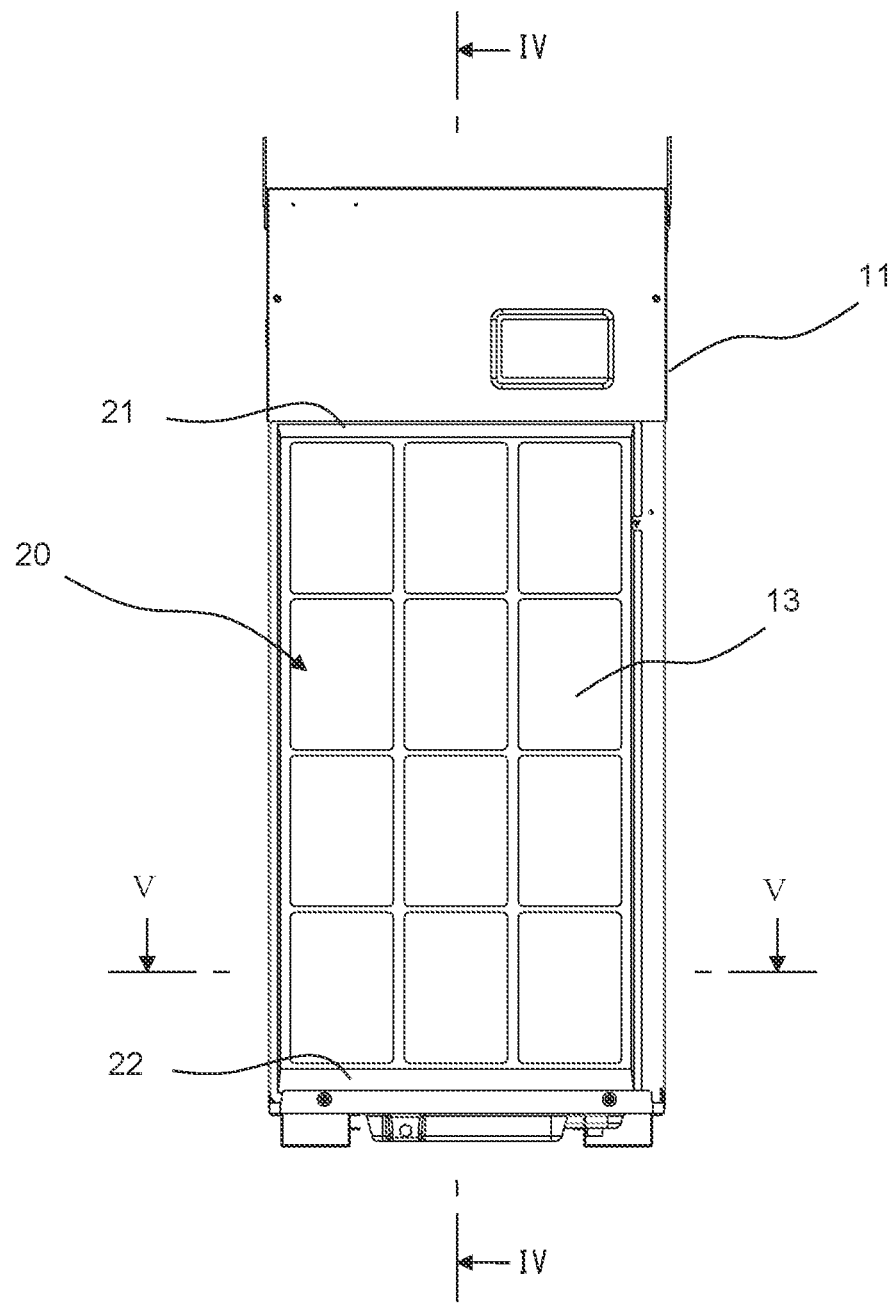
FIG. 3 is a front view of the oil cooling apparatus according to the first embodiment.

FIG. 2 is a perspective view of the oil cooling apparatus 10, and FIG. 3 is a front view of the oil cooling apparatus 10. As illustrated in FIGS. 2 and 3, the oil cooling apparatus 10 includes the housing 11 having a vertically long rectangular parallelepiped shape. A suction port 12 located on the upstream side of the condenser 3 is provided on one side surface of the housing 11. A filter 13 is attached to the suction port 12. In FIG. 2, reference numeral 14 denotes a blow-out port provided on the top surface side of the housing 11. In FIG. 3, reference numeral 20 denotes an attachment frame, reference numeral 21 denotes an upper frame portion, and reference numeral 22 denotes a lower frame portion.

The refrigerant circuit RC, the four-way switching valve 2, the fan 6, and the controller 50, which are illustrated in FIG. 1, are housed in the housing 11.

The filter 13, the condenser 3, and the fan 6 are disposed in the order of the filter 13, the condenser 3, and the fan 6 from the suction port 12 side toward the inside of the housing 11.

In the oil cooling apparatus 10, outside air is sucked in from the suction port 12 via the filter 13 by the fan 6, supplied to the condenser 3, and then discharged from the blow-out port 14.

Figure 4:
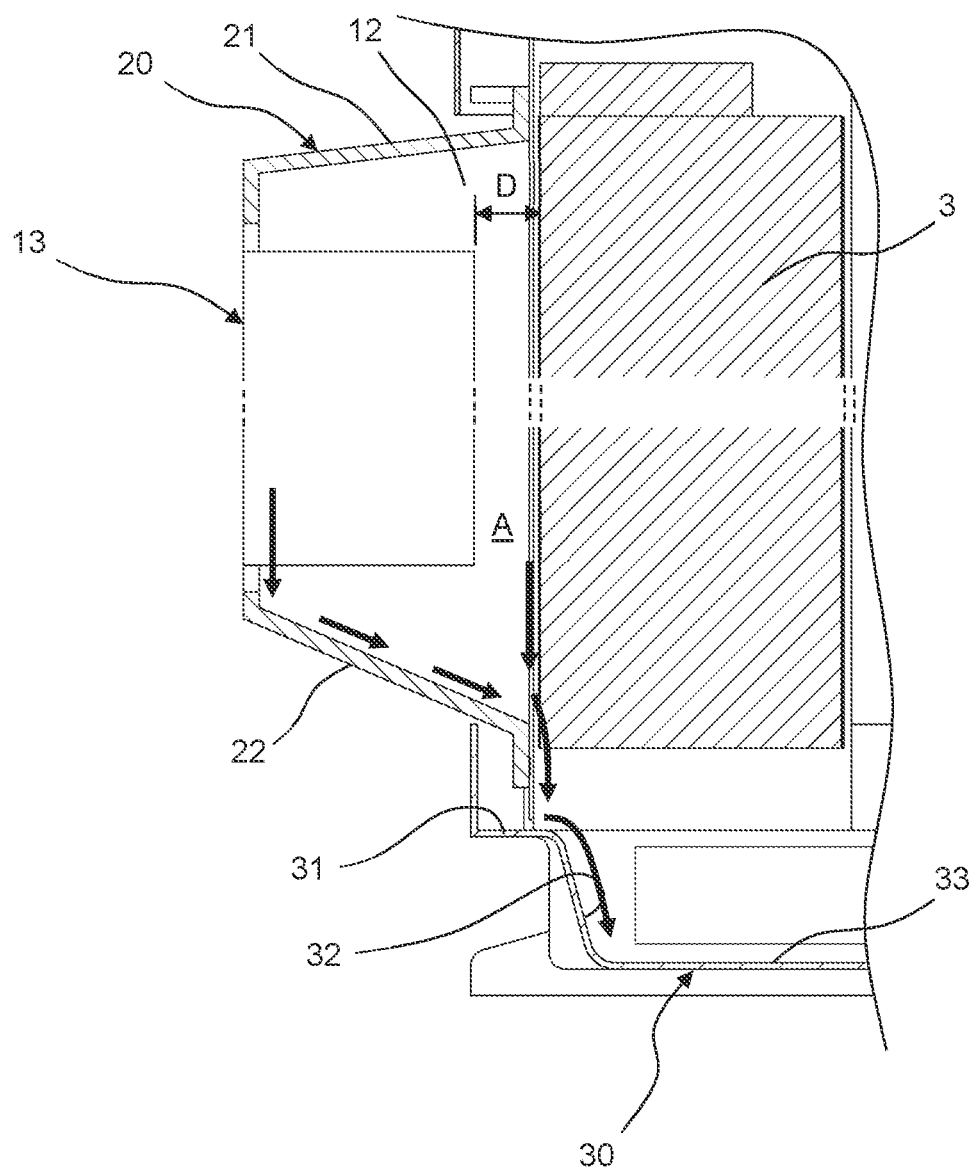
FIG. 4 is a view of a main part of a longitudinal section taken along line IV-IV in FIG. 3.
Figure 5:
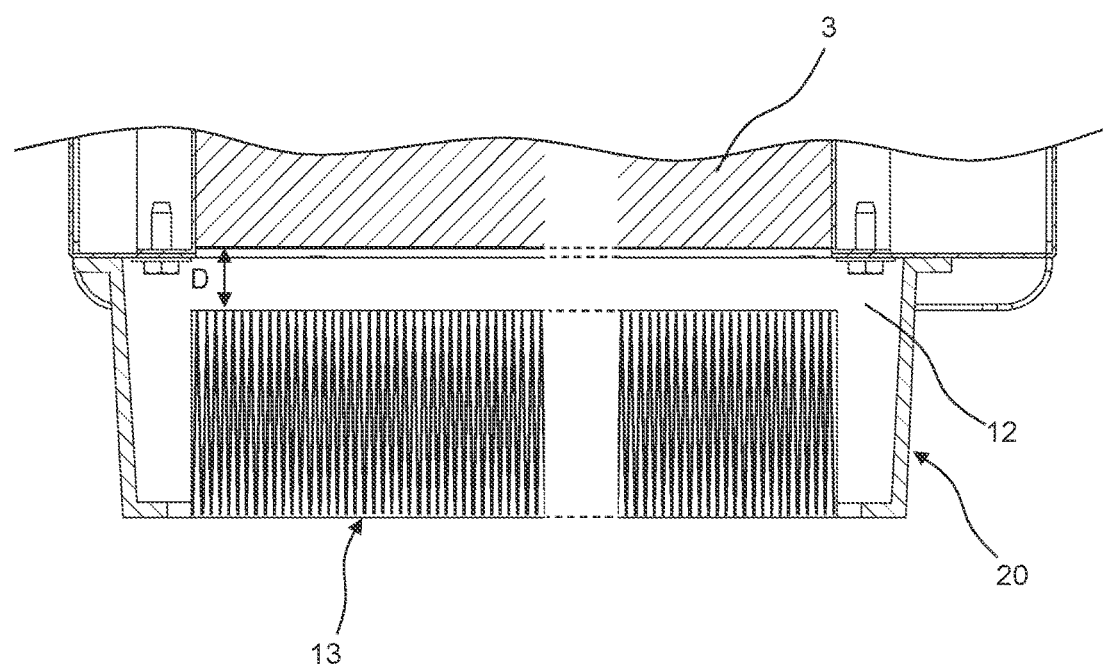
FIG. 5 is a view of a main part of a cross section taken along line V-V in FIG. 3.

FIG. 4 is a view of a main part of a longitudinal section taken along line IV-IV in FIG. 3, and FIG. 5 is a view of a main part of a cross section taken along line V-V in FIG. 3. In FIGS. 4 and 5, the filter 13 is attached to the suction port 12 of the housing 11 at an interval D (10 mm in this embodiment) from the condenser 3.

As illustrated in FIGS. 4 and 5, the housing 11 has a bottom frame 30 that covers the lower side of the housing 11. The bottom frame 30 has an oil receiver 31, a guide path 32, and an oil reservoir 33. The oil receiver 31 is provided below a space A between the condenser 3 and the filter 13. The guide path 32 guides the oil from the oil receiver 31. The oil reservoir 33 has a recess shape that stores the oil guided by the guide path 32. Note that in this embodiment, the oil receiver 31, the guide path 32, and the oil reservoir 33 are formed integrally with the bottom frame 30, but the oil receiver, the guide path, and the oil reservoir may be provided separately from the bottom frame.

The filter 13 is attached to the housing 11 by using an attachment frame 20. A lower frame portion 22 of the attachment frame 20 is inclined toward the condenser 3 and downward. In addition, the filter 13 having a filter material 13a folded in a bellows shape has high rigidity, so that the distance D between the filter 13 and the condenser 3 can be kept by fixing the filter 13 to the attachment frame 20.

Figure 6:
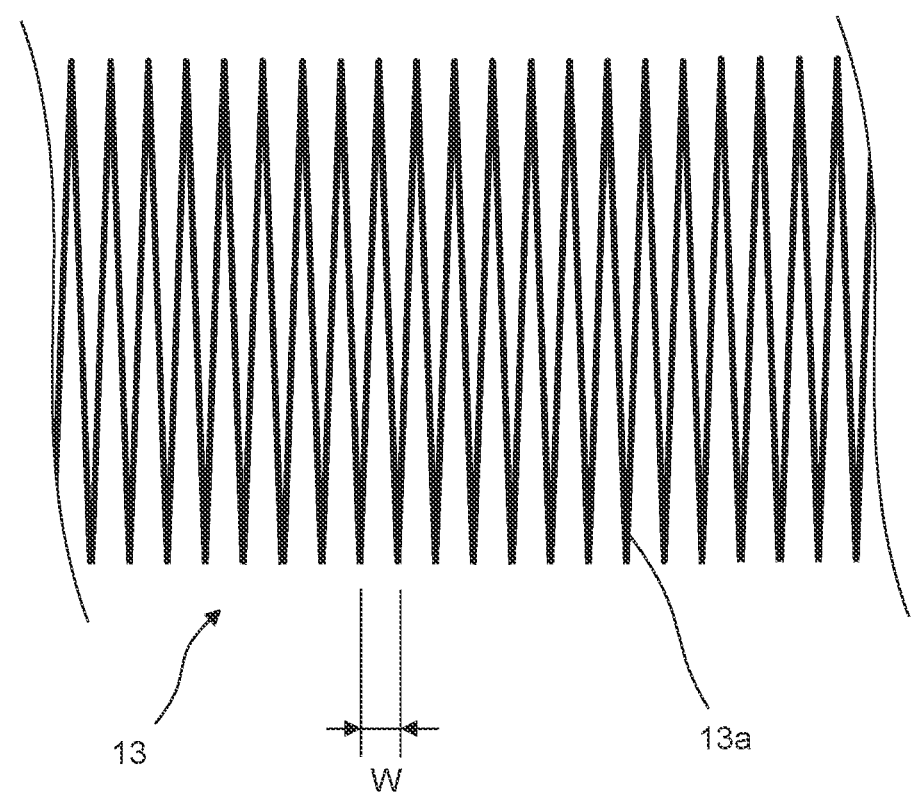
FIG. 6 is a top view of a filter of the oil cooling apparatus according to the first embodiment.

In addition, the filter 13 is configured to guide oil droplets adhering to the surface of the filter 13 downward. Specifically, the filter 13 having the filter material 13a folded in a bellows shape illustrated in FIG. 6 is attached to the suction port 12 of the housing 11 such that creases extend along the vertical direction. The filter 13 is formed by folding a non-woven fabric having a fiber diameter of several μm into a bellows shape. In this embodiment, by setting an interval W between the creases of the filter material 13a to a range of 2.0 mm to 7.0 mm, a filter material pressure loss and a structural pressure loss are adjusted, whereby a low pressure loss is realized.

In the first embodiment, a non-woven fabric is used for the filter material 13a of the filter 13, but the filter material is not limited thereto, and other filter materials, such as glass fiber, may be used.

In the filter 13 of the first embodiment, a retention amount is improved by increasing the surface area of the filter material to a range of 15 times to 45 times as large as that of a planar filter, thereby realizing a long lifetime.

Note that the filter 13 of the oil cooling apparatus 10 of the present disclosure is formed such that, in order to keep the interval W between the creases constant, adjacent folded pieces, in which mountain fold creases and valley fold creases are alternately formed, keep a V shape between them by using an adhesive on the front and back surfaces of each of the folded pieces. In addition, it may be configured such that adjacent folded pieces, in which mountain fold creases and valley fold creases are alternately formed, keep a V shape between them by inserting a stabilizer, a separator, or the like between the folded pieces.

In addition, filter frames may be installed on four sides in order that the filter 13 can hold the folding shape.

In an oil cooling operation of the oil cooling apparatus 10, a high-pressure gas refrigerant discharged from the compressor 1 flows into the condenser 3 via the four-way switching valve 2, and is condensed by heat exchange with outside air in the condenser 3 to become a liquid refrigerant. Next, the liquid refrigerant decompressed in the electronic expansion valve EV flows into the evaporator 4, exchanges heat with the oil, evaporates to become a low-pressure gas refrigerant, and returns to the suction side of the compressor 1 via the accumulator 5. Accordingly, the oil is cooled in the evaporator 4. In the oil cooling operation, the controller 50 controls the rotation frequency of the compressor 1 and the opening degree of the electronic expansion valve EV based on the temperature of the oil, room temperature, and the like. Note that the hot gas bypass valve HGB disposed in the hot gas bypass pipe L10 adjust the amount of high-temperature and high-pressure gas to be supplied to the evaporator 4, thereby controlling cooling capacity at low load.

In a conventional oil cooling apparatus, a net-shaped or roll-shaped filter is attached to a suction port when the oil cooling apparatus is used in an oil mist atmosphere under an environment where a machine tool is installed.

The present inventors have found that in such a conventional oil cooling apparatus, one of the factors that cause a condenser to be clogged is that: air containing oil mist is sucked in via a filter and supplied to the condenser, so that the filter pushed by wind pressure comes into contact with the condenser: and an oil component and dust trapped by the filter move to the condenser side and remain between the filter and the condenser together with an oil component adhering to the condenser side.

Therefore, in the oil cooling apparatus 10 using the refrigeration apparatus of the present disclosure, the filter 13 is attached to the suction port 12 of the housing 11 at the interval D from the condenser 3 (heat exchanger). As a result, in the oil cooling apparatus 10 installed under an environment of an oil mist atmosphere, an oil component trapped by the filter 13 cannot easily move to the condenser 3 side, even when air containing oil mist is supplied to the condenser 3 via the filter 13 and the oil component in the air containing oil mist is trapped by the filter 13, so that clogging of the condenser 3 can be suppressed.

In the refrigeration apparatus having the above configuration, the filter 13 attached to the suction port 12 of the housing 11 has the filter material 3a folded in a bellows shape, so that the surface of the filter 13 area becomes larger than that of a filter having a flat shape. Therefore, when air containing oil mist is supplied to the condenser 3 via the filter 13, the filter having a large surface area can hold a lot of oil components, which extends a lifetime (a time until the filter is clogged).

In addition, an oil component trapped by the filter 13 flows downward, and an oil component adhering to the front surface side of the condenser 3 flows downward. The oil components that have flowed down are received by the oil receiver 31 provided below the space A between the condenser 3 and the filter 13. The oil received by the oil receiver 31 is guided to the oil reservoir 33 by the guide path 32. As a result, the oil components adhering to the filter 13 and the condenser 3 can be stored in the oil reservoir 33 and collectively treated without contaminating the surroundings of the apparatus with the oil.

Figure 7:
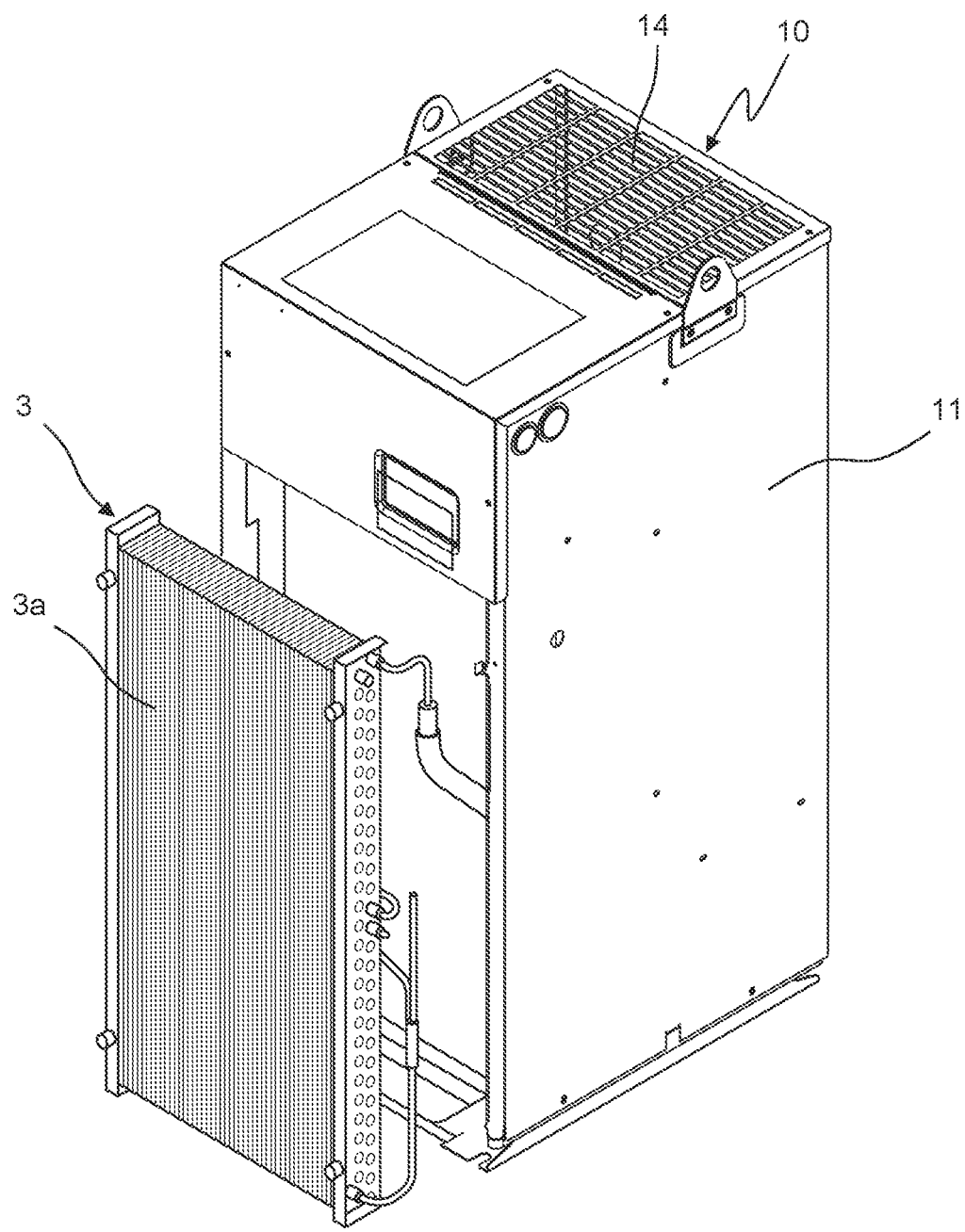
FIG. 7 is a perspective view illustrating a configuration of a condenser of the oil cooling apparatus according to the first embodiment.

In addition, FIG. 7 illustrates a state in which the condenser 3 is removed from the housing 11 for cleaning. As illustrated in FIG. 7, a plurality of plate-shaped fins 3a of the condenser 3 is disposed in parallel to each other and extends along the vertical direction. As a result, the oil component adhering to the front surface side of the condenser 3 smoothly flows downward as indicated by the arrows in FIG. 4. Therefore, clogging, occurring due to oil droplets remaining between the fins 3a, can be effectively suppressed.

In addition, the filter 13 is configured to guide oil droplets adhering to the surface of the filter 13 downward, so that an oil component adhering to the filter 13 smoothly flows downward as indicated by the arrows in FIG. 4. As a result, clogging, occurring due to oil droplets remaining in the filter 13, can be effectively suppressed.

In addition, the filter 13 is attached to the suction port 12 of the housing 11 such that the creases of the filter material 13a of the filter 13 extend along the vertical direction, so that an oil component adhering to the filter 13 smoothly flows downward. As a result, clogging, occurring due to oil droplets remaining in the filter 13, can be effectively suppressed.

In addition, the lower frame portion 22 of the attachment frame 20 for attaching the filter 13 to the housing 11 is inclined toward the condenser 3 side and downward, so that the oil droplets that have adhered to the surface of the filter 13 and flowed downward can be flowed to a lower portion on the condenser 3 side along the inclination of the lower frame portion 22 of the attachment frame 20. The oil droplets can be treated together with the oil droplets that have adhered to the front surface (on the suction port 12 side) of the condenser 3 and flowed downward, as illustrated in FIG. 4.

In addition, the oil cooling apparatus 10, capable of suppressing clogging of the condenser 3 (first heat exchanger) in an oil mist atmosphere, can be realized in the first embodiment.

Figure 8:
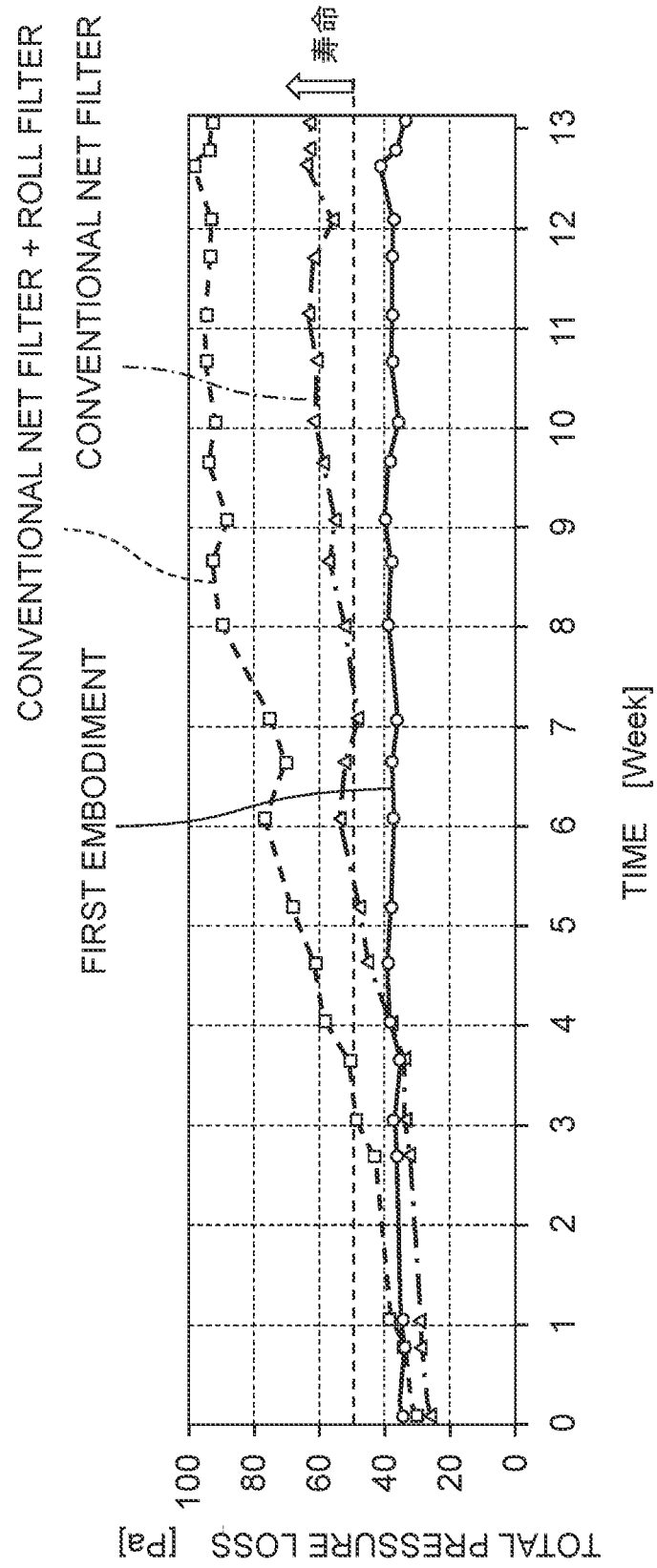
FIG. 8 is a graph showing changes in total pressure loss in the filter of the oil cooling apparatus according to the first embodiment.

FIG. 8 shows, in an oil cooling apparatus installed under an environment of an oil mist atmosphere, changes in total pressure loss in each of a case where a conventional net filter is used, a case where a conventional net filter and a roll filter (a filter obtained by winding a non-woven fabric in a roll shape) are used, and a case where the filter 13 of the first embodiment is used. In FIG. 8, the horizontal axis represents time (Week) (unit of week), and the vertical axis represents total pressure loss (Pa).

Here, the total pressure loss was determined by the following equation under a condition in which an oil mist concentration is about 1 mg/m$^3$.

Total pressure loss (Pa)=Filter pressure loss (Pa)+ Condenser pressure loss (Pa)

Filter pressure loss: air pressure difference between upstream and downstream of the filter 13 measured by a differential pressure gauge Condenser pressure loss: air pressure difference between upstream and downstream of the condenser 3 measured by a differential pressure gauge In the case where a conventional net filter was used, the total pressure loss exceeded 50 Pa that is assumed to be a filter lifetime in about 5.5 weeks, as shown in FIG. 8. In addition, in the case where a conventional net filter and a roll filter were used, the total pressure loss exceeded 50 Pa that was assumed to be a filter lifetime in about 3.5 weeks.

On the other hand, in the case where the filter 13 of this embodiment was used, a rapid increase in the total pressure loss was not observed even after 13 weeks, and the total pressure loss was less than 50 Pa that was assumed to be a filter lifetime.

In the case where a conventional net filter and a roll filter are used, it is necessary to replace the filters about once every three weeks, as described above, whereas in the oil cooling apparatus 10 using the refrigeration apparatus of the first embodiment, the filter may be replaced about once every a year.

In addition, in the oil cooling apparatus 10, it is not necessary to perform cleaning of the condenser 3 (heat exchanger), which has been performed about once every two years, for a long period of time equal to or longer than the product lifetime (7 years) of the oil cooling apparatus 10.

Therefore, the refrigeration apparatus 10 capable of suppressing clogging of the heat exchanger in an oil mist atmosphere can reduce the cost of maintenance work and suppress a decrease in the operation rate of the machine tool 100.

Second Embodiment

There is provided a liquid cooling apparatus using a refrigeration apparatus according to a second embodiment of the present disclosure. This liquid cooling apparatus is used in an oil mist atmosphere to cool cutting fluid by a refrigeration apparatus having a configuration similar to that of the refrigeration apparatus used in the oil cooling apparatus 10 of the first embodiment.

The liquid cooling apparatus according to the second embodiment has effects similar to those of the oil cooling apparatus 10 of the first embodiment.

In the first and second embodiments, the oil cooling apparatus 10 using the refrigeration apparatus that cools the oil (hydraulic oil or lubricating oil) for the machine tool 100 and the liquid cooling apparatus using the refrigeration apparatus that cools cutting fluid have been described. However, the refrigeration apparatus of the present invention may be applied to a liquid cooling apparatus that cools another liquid.

Third Embodiment

There is provided an air conditioner that is one example of a refrigeration apparatus according to a third embodiment of the present disclosure. This air conditioner is used in an oil mist atmosphere to perform at least one air conditioning operation of cooling or heating by a refrigeration apparatus having a configuration similar to that of the refrigeration apparatus used in the oil cooling apparatus 10 of the first embodiment.

The air conditioner according to the third embodiment has effects similar to those of the oil cooling apparatus 10 of the first embodiment.

Fourth Embodiment

Figure 9:
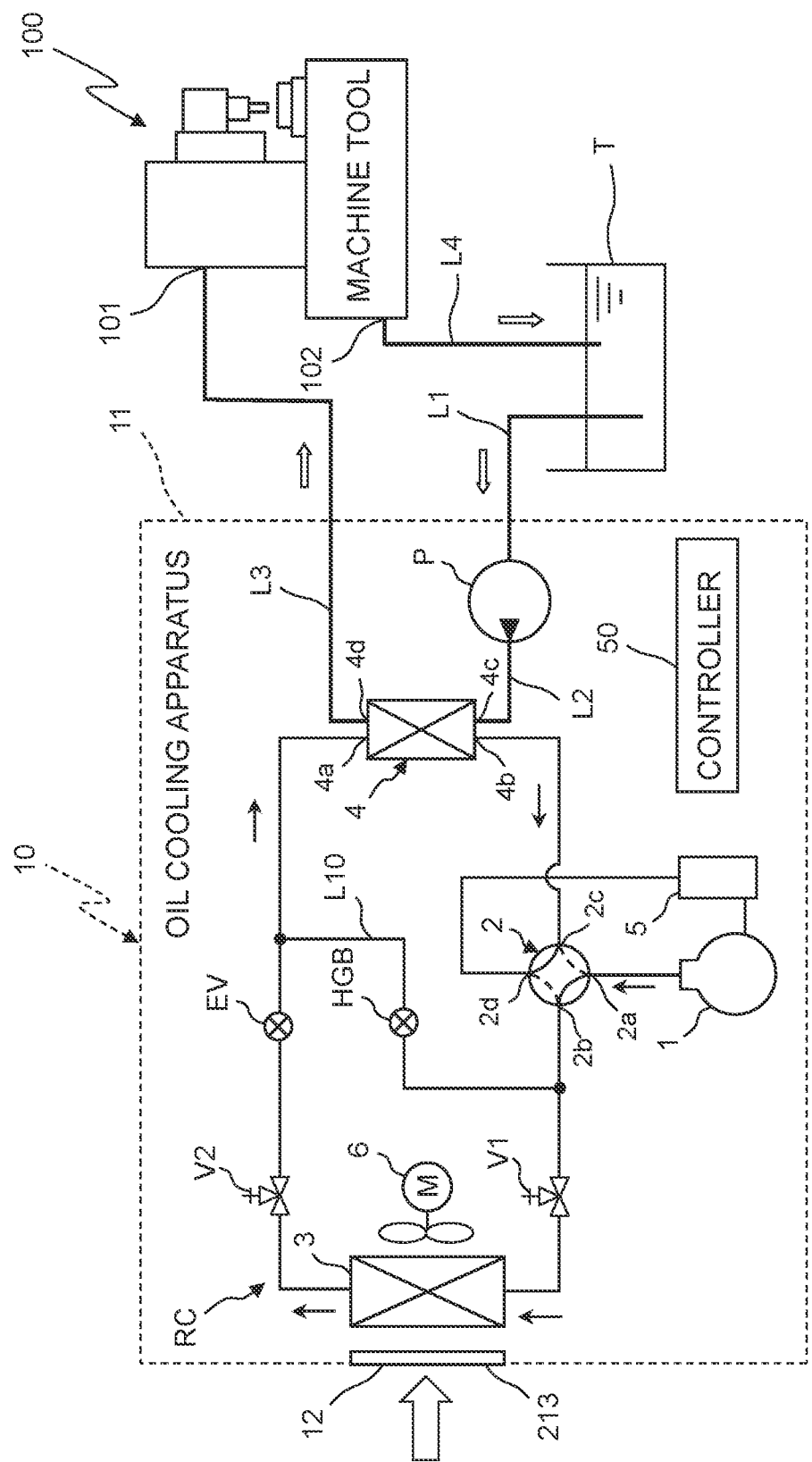
FIG. 9 is a schematic configuration view of an oil cooling apparatus using a refrigeration apparatus according to a fourth embodiment of the present disclosure.

FIG. 9 is a schematic configuration view of an oil cooling apparatus 10 using a refrigeration apparatus according to a fourth embodiment of the present disclosure. The oil cooling apparatus 10 cools hydraulic oil, lubricating oil, or cutting fluid (hereinafter referred to as "oil") for a machine tool 100, while circulating the same via an oil tank T. The machine tool 100 is an industrial machine such as: a machine tool such as an NC lathe, a grinding machine, or an NC dedicated machine; a molding machine; or a press machine.

As illustrated in FIG. 9, the oil cooling apparatus 10 according to the fourth embodiment includes a refrigerant circuit RC, a four-way switching valve 2, a fan 6, and a controller 50. A compressor 1, a condenser 3, an electronic expansion valve EV, and an evaporator 4 are annularly connected in the refrigerant circuit RC. The four-way switching valve 2 switches a refrigerant circulation direction in the refrigerant circuit RC from a forward cycle to a reverse cycle. The fan 6 supplies air to the condenser 3. The controller 50 controls the refrigerant circuit RC, the four-way switching valve 2, and the fan 6. The electronic expansion valve EV is one example of a decompression mechanism. In addition, the refrigerant circuit RC has a hot gas bypass pipe L10 and a hot gas bypass valve HGB disposed in the hot gas bypass pipe L10.

The condenser 3 is one example of a first heat exchanger, and the evaporator 4 is one example of a second heat exchanger.

The discharge side of the compressor 1 is connected to a first port 2a of the four-way switching valve 2. A second port 2b of the four-way switching valve 2 is connected to one end of the condenser 3 via a shut-off valve V1. The other end of the condenser 3 is connected to one end of the electronic expansion valve EV via a shut-off valve V2.

In addition, the other end of the electronic expansion valve EV is connected to one end 4a of the evaporator 4. In addition, the other end 4b of the evaporator 4 is connected to a third port 2c of the four-way switching valve 2. Furthermore, a fourth port 2d of the four-way switching valve 2 is connected to the suction side of the compressor 1 via an accumulator 5. In addition, one end of the hot gas bypass pipe L10 is connected to the one end 4a side of the evaporator 4. The other end of the hot gas bypass pipe L10 is connected to the second port 2b side of the four-way switching valve 2.

In addition, the other end of a pipe L1 whose one end is immersed in the oil in the oil tank T is connected to the suction port of a circulation pump P. The discharge port of the circulation pump P is connected to an inflow port 4c of the evaporator 4 via a pipe L2.

In addition, one end of a pipe L3 is connected to an outflow port 4d of the evaporator 4, and the other end of the pipe L3 is connected to an inflow port 101 of the machine tool 100. An outflow port 102 of the machine tool 100 and the oil tank T are connected via a pipe L4.

The oil tank T, the evaporator 4, the machine tool 100, and the pipes L1 to L4 constitute a circulation path through which the oil circulates.

The oil cooling apparatus 10 and the circulation path constitute an oil cooling system. Note that in the fourth embodiment, the oil cooling apparatus 10 includes the circulation pump P; however, it may be configured such that a circulation pump is provided separately from the oil cooling apparatus and the oil cooling apparatus, the circulation pump, and the circulation path constitute the oil cooling system.

In the oil cooling apparatus 10, after a refrigerant is recovered into the evaporator 4 by a pump down operation, the condenser 3 is removed from a housing 11 to clean the condenser 3. In the pump down operation, the coil of the four-way switching valve 2 is excited to switch the refrigerant circulation direction in the refrigerant circuit to a reverse cycle.

Figure 10:
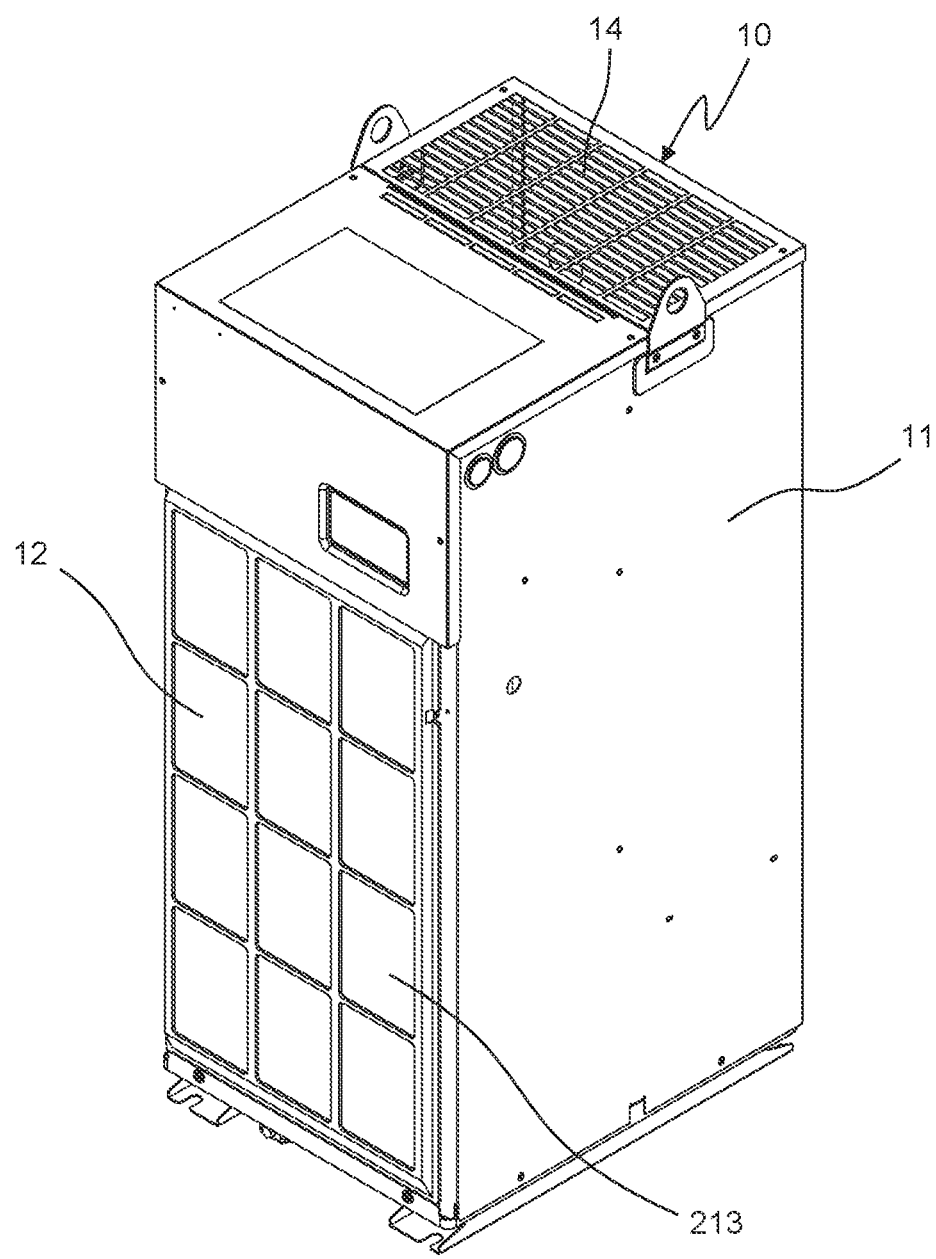
FIG. 10 is a perspective view of the oil cooling apparatus according to the fourth embodiment.
Figure 11:
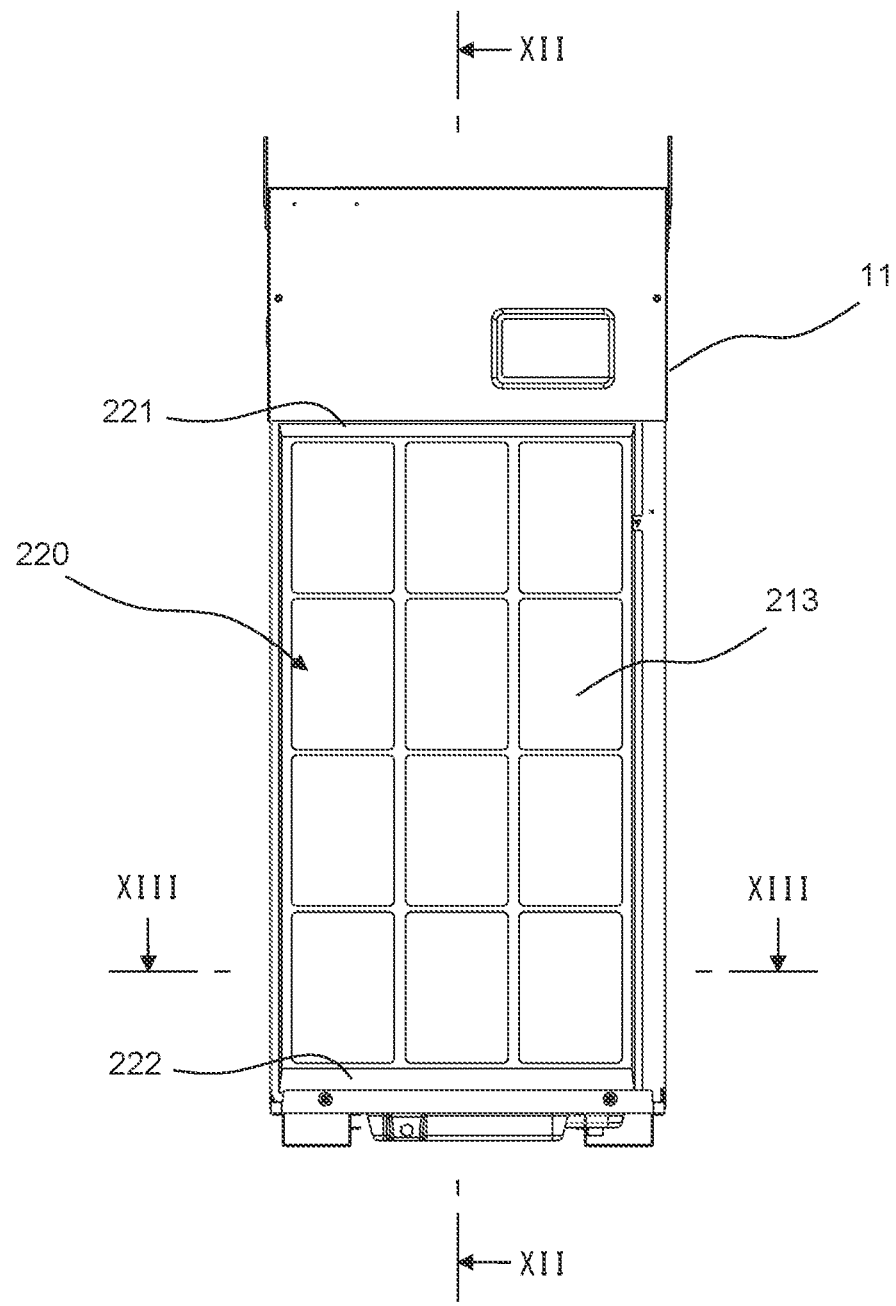
FIG. 11 is a front view of the oil cooling apparatus according to the fourth embodiment.

FIG. 10 is a perspective view of the oil cooling apparatus 10, and FIG. 11 is a front view of the oil cooling apparatus 10. As illustrated in FIGS. 10 and 11, the oil cooling apparatus 10 includes the housing 11 having a vertically long rectangular parallelepiped shape. A suction port 12 located on the upstream side of the condenser 3 is provided on one side surface of the housing 11. A filter 213 is attached to the suction port 12. In FIG. 10, reference numeral 14 denotes a blow-out port provided on the top surface side of the housing 11. In FIG. 11, reference numeral 220 denotes an attachment frame, reference numeral 221 denotes an upper frame portion, and reference numeral 222 denotes a lower frame portion.

The refrigerant circuit RC, the four-way switching valve 2, the fan 6, and the controller 50 illustrated in FIG. 9 are housed in the housing 11.

The filter 213, the condenser 3, and the fan 6 are disposed in the order of the filter 213, the condenser 3, and the fan 6 from the suction port 12 side toward the inside of the housing 11.

In the oil cooling apparatus 10, outside air is sucked from the suction port 12 via the filter 213 by the fan 6, supplied to the condenser 3, and then discharged from the blow-out port 14.

Figure 12:
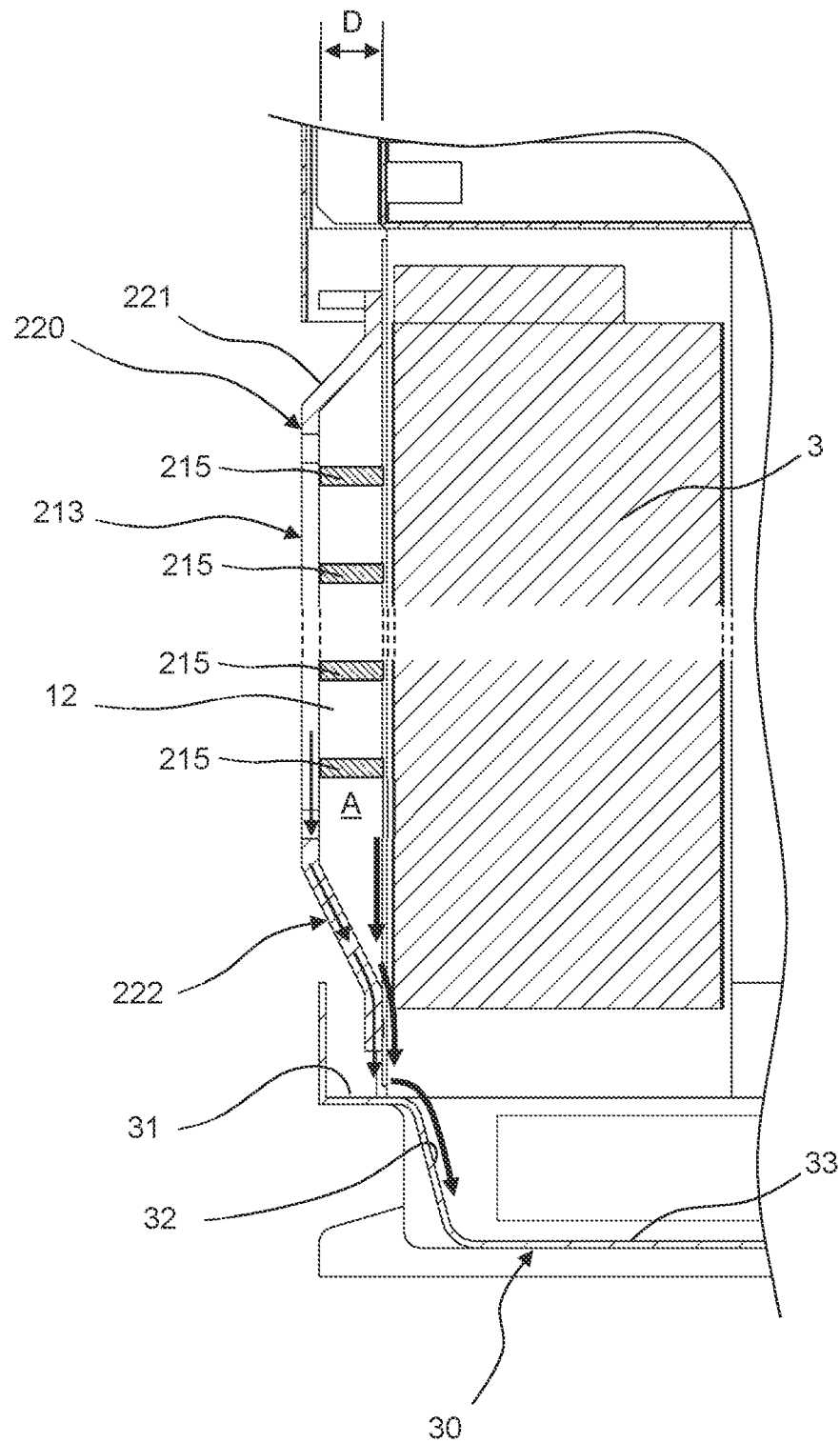
FIG. 12 is a view of a main part of a longitudinal section taken along line XII-XII in FIG. 11.
Figure 13:
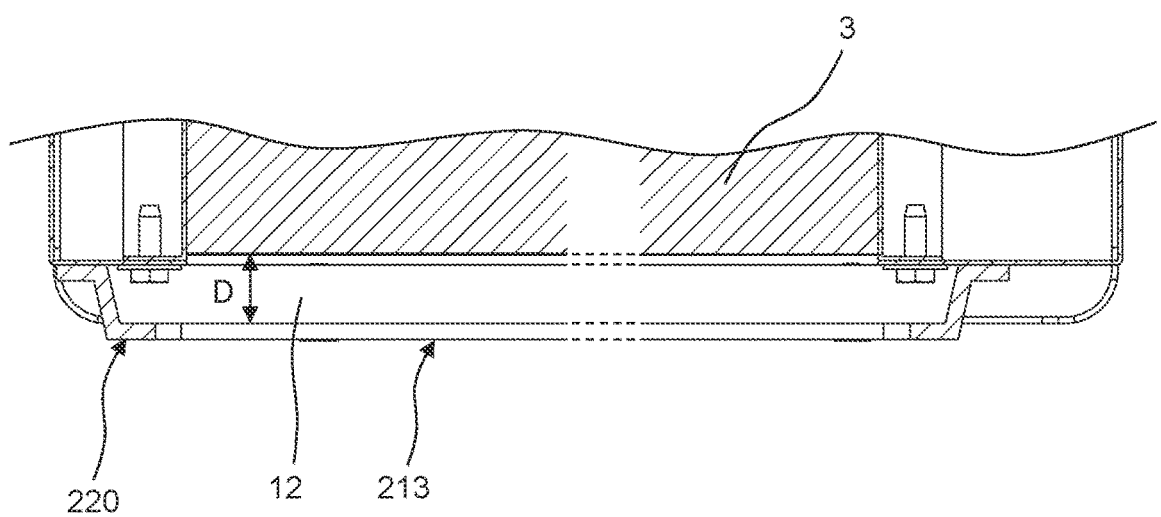
FIG. 13 is a view of a main part of a cross section taken along line XIII-XIII in FIG. 11.

FIG. 12 is a view of a main part of a longitudinal section taken along line XII-XII in FIG. 11, and FIG. 13 is a view of a main part of a cross section taken along line XIII-XIII in FIG. 11. In FIGS. 12 and 13, the filter 213 is attached to the suction port 12 of the housing 11 at an interval D (10 mm in this embodiment) from the condenser 3. In FIG. 12, by providing a plurality of support members 215 between the filter 213 and the condenser 3, the filter 213 is configured to be held not to come into contact with the condenser 3 (heat exchanger).

As illustrated in FIGS. 12 and 13, the housing 11 having a rectangular parallelepiped shape has a bottom frame 30 that covers the lower side of the housing 11. The bottom frame 30 has an oil receiver 31, a guide path 32, and an oil reservoir 33. The oil receiver 31 is provided below a space A between the condenser 3 and the filter 213. The guide path 32 guides the oil from the oil receiver 31. The oil reservoir 33 has a recess shape that stores the oil guided by the guide path 32. Note that in this embodiment, the oil receiver 31, the guide path 32, and the oil reservoir 33 are formed integrally with the bottom frame 30, but the oil receiver, the guide path, and the oil reservoir may be provided separately from the bottom frame.

The filter 213 is attached to the housing 11 by using an attachment frame 220. A lower frame portion 222 of the attachment frame 220 is inclined toward the condenser 3 side and downward. In addition, in order to keep the interval D between the filter 213 and the condenser 3, the filter 213 may be held by, for example, a plurality of horizontal bars and a plurality of vertical bars provided in the attachment frame 220, or the filter 213 may be held by another means.

In addition, a plurality of plate-shaped fins 3a of the condenser 3 is disposed in parallel to each other and extends along the vertical direction, as illustrated in FIG. 7.

In addition, the filter 213 is configured to guide oil droplets adhering to the surface of the filter 213 downward. A flat sheet-shaped filter having a surface provided with grooves (or ridges) in the longitudinal direction is attached to the suction port 12 of the housing 11.

Note that the filter 213 of the oil cooling apparatus 10 of the present disclosure is not limited to a shape in which a filter material is bent in a bellows shape, and may be, for example, a flat sheet-shaped filter.

In an oil cooling operation of the oil cooling apparatus 10, a high-pressure gas refrigerant discharged from the compressor 1 flows into the condenser 3 via the four-way switching valve 2, and is condensed by heat exchange with outside air in the condenser 3 to become a liquid refrigerant. Next, the liquid refrigerant decompressed in the electronic expansion valve EV flows into the evaporator 4, exchanges heat with the oil, evaporates to become a low-pressure gas refrigerant, and returns to the suction side of the compressor 1 via the accumulator 5. Accordingly, the oil is cooled in the evaporator 4. In the oil cooling operation, the controller 50 controls the rotation frequency of the compressor 1 and the opening degree of the electronic expansion valve EV based on the temperature of the oil, room temperature, and the like. Note that in the hot gas bypass valve HGB disposed in the hot gas bypass pipe L10 adjusts the amount of high-temperature and high-pressure gas to be supplied to the evaporator 4, thereby controlling cooling capacity at low load.

In a conventional oil cooling apparatus, a net-shaped or roll-shaped filter is attached to a suction port when the oil cooling apparatus is used in an oil mist atmosphere under an environment where a machine tool is installed.

The present inventors have found that in such a conventional oil cooling apparatus, one of the factors that cause a condenser to be clogged is that: air containing oil mist is sucked in via a filter and supplied to the condenser, so that the filter pushed by wind pressure comes into contact with the condenser; and an oil component and dust trapped by the filter move to the condenser side and remain between the filter and the condenser together with an oil component adhering to the condenser side.

Therefore, in the oil cooling apparatus 10 using the refrigeration apparatus of the present disclosure, the filter 213 is attached to the suction port 12 of the housing 11 at the interval D from the condenser 3 (heat exchanger). As a result, in the oil cooling apparatus 10 installed under an environment of an oil mist atmosphere, an oil component trapped by the filter 213 cannot easily move to the condenser 3 side, even when air containing oil mist is supplied to the condenser 3 via the filter 213 and the oil component in the air is trapped by the filter 213, so that clogging of the condenser 3 can be suppressed.

In addition, the oil component trapped by the filter 213 flows downward, and the oil component adhering to the front surface side of the condenser 3 flows downward. The oil components are received by the oil receiver 31 provided below the space A between the condenser 3 and the filter 213. The oil received by the oil receiver 31 is guided to the oil reservoir 33 by the guide path 32. As a result, the oil components adhering to the filter 213 and the condenser 3 can be stored in the oil reservoir 33 and collectively treated without contaminating the surroundings of the apparatus with the oil.

In addition, since the plurality of plate-shaped fins 3a of the condenser 3 is disposed in parallel to each other and extends along the vertical direction, the oil component adhering to the front surface side of the condenser 3 smoothly flows downward as indicated by the arrows in FIG. 12. As a result, clogging, occurring due to oil droplets remaining between the fins 3a, can be effectively suppressed.

In addition, the filter 213 is configured to guide the oil droplets adhering to the surface of the filter 213 downward, so that the oil component adhering to the filter 213 smoothly flows downward as indicated by the arrows in FIG. 12. As a result, clogging, occurring due to oil droplets remaining in the filter 213, can be effectively suppressed.

In addition, the lower fame portion 222 of the attachment frame 220 for attaching the filter 213 to the housing 11 is inclined toward the condenser 3 side and downward, so that the oil droplets that have adhered to the surface of the filter 213 and flowed downward can be flowed to into a lower portion on the condenser 3 side along the inclination of the lower frame portion 222 of the attachment frame 220, as illustrated in FIG. 12. The oil droplets can be treated together with the oil droplets that have adhered to the front surface (on the suction port 12 side) of condenser 3 and flowed downward.

In addition, the oil cooling apparatus 10, capable of suppressing clogging of the condenser 3 (first heat exchanger) in an oil mist atmosphere, can be realized in the fourth embodiment. As a result, the cost of maintenance work can be reduced, and a decrease in the operation rate of the machine tool 100 can be suppressed.

Fifth Embodiment

There is provided a liquid cooling apparatus using a refrigeration apparatus according to a fifth embodiment of the present disclosure. This liquid cooling apparatus is used in an oil mist atmosphere to cool cutting fluid by a refrigeration apparatus having a configuration similar to that of the refrigeration apparatus used in the oil cooling apparatus 10 of the fourth embodiment.

The liquid cooling apparatus according to the fifth embodiment has effects similar to those of the oil cooling apparatus 10 of the fourth embodiment.

In the fourth and fifth embodiments, the oil cooling apparatus 10 using the refrigeration apparatus that cools the oil (hydraulic oil or lubricating oil) for the machine tool 100 and the liquid cooling apparatus using the refrigeration apparatus that cools the cutting fluid have been described. However, the refrigeration apparatus of the present invention may be applied to a liquid cooling apparatus that cools another liquid.

Sixth Embodiment

There is provided an air conditioner that is one example of a refrigeration apparatus according to a sixth embodiment of the present disclosure. This air conditioner is used in an oil mist atmosphere to perform at least one air conditioning operation of cooling or heating by a refrigeration apparatus having a configuration similar to that of the refrigeration apparatus used in the oil cooling apparatus 10 of the fourth embodiment.

The air conditioner according to the sixth embodiment has effects similar to those of the oil cooling apparatus 10 of the fourth embodiment.

In addition, the refrigeration apparatus that cools oil (hydraulic oil or lubricating oil), the refrigeration apparatus that cools cutting fluid, and the air conditioner have been described in the first to sixth embodiments. However, the present invention may be applied to a refrigeration apparatus having another configuration to be used in an oil mist atmosphere. In this case, a heat exchanger to which air containing oil mist, sucked in through a filter, is supplied may be a heat exchanger functioning as a condenser or a heat exchanger functioning as an evaporator.

Although specific embodiments of the present disclosure have been described, the present disclosure is not limited to the first to sixth embodiments, and various modifications can be made within the scope of the present disclosure.

A refrigeration apparatus of the present disclosure includes:
  a refrigerant circuit having a heat exchanger;
  a housing that houses at least the heat exchanger and is provided with a suction port on an upstream side of the heat exchanger; and
  a filter attached to the suction port of the housing, in which
  the filter is attached to the suction port of the housing at an interval from the heat exchanger, and
  when air containing oil mist is supplied to the heat exchanger via the filter, at least a part of an oil component in the air containing oil mist is trapped by the filter.

According to the present disclosure, by attaching the filter to the suction port of the housing at an interval from the heat exchanger, the oil component trapped by the filter cannot easily be transmitted to the heat exchanger side, even when the air containing oil mist is supplied to the heat exchanger via the filter and the oil component in the air is trapped by the filter. As a result, clogging of the heat exchanger can be suppressed.

In addition, the refrigeration apparatus according to one aspect of the present disclosure includes:
  an oil receiver provided below a space between the heat exchanger and the filter;
  a guide path that guides the oil from the oil receiver; and
  an oil reservoir that stores the oil guided by the guide path.

According to the present disclosure, the oil components that have adhered to the filter and the heat exchanger can be stored in the oil reservoir and collectively treated without contaminating the surroundings of the apparatus with the oil.

In addition, in the refrigeration apparatus according to one aspect of the present disclosure,
  a plurality of plate-shaped fins of the heat exchanger is disposed in parallel to each other and extends along a vertical direction.

According to the present disclosure, the oil component that have adhered to the front surface side of the heat exchanger smoothly flows downward, so that clogging, occurring due to oil droplets remaining between the fins, can be effectively suppressed.

In addition, in the refrigeration apparatus according to one aspect of the present disclosure,
  the filter is configured to guide oil droplets adhering to a surface of the filter downward.

According to the present disclosure, an oil component that has adhered to the filter smoothly flows downward, so that clogging, occurring due to oil droplets remaining in the filter, can be effectively suppressed.

In addition, the refrigeration apparatus according to one aspect of the present disclosure includes an attachment frame for attaching the filter to the housing, in which
  a lower frame portion of the attachment frame is inclined toward the heat exchanger side and downward.

According to the present disclosure, oil droplets that have adhered to the surface of the filter and flowed downward can be collected into a lower portion on the heat exchanger side along the inclination of the lower frame portion of the attachment frame. The oil droplets can be treated together with oil droplets that have adhered to the heat exchanger and flowed downward.

In addition, an oil cooling apparatus of the present disclosure includes any one of the refrigeration apparatuses, in which
  the refrigerant circuit of the refrigeration apparatus has the heat exchanger that is a first heat exchanger functioning as a condenser and a second heat exchanger functioning as an evaporator, and
  the oil is cooled by the second heat exchanger.

According to the present disclosure, an oil cooling apparatus, capable of suppressing clogging of the first heat exchanger functioning as a condenser in an oil mist atmosphere, can be realized.

What is claimed is:
1. A refrigeration apparatus comprising:
  a refrigerant circuit having a heat exchanger;
  a housing that houses at least the heat exchanger, the housing being provided with a suction port on an upstream side of the heat exchanger; and
  a filter attached to the suction port of the housing by using an attachment frame, the filter being configured to be held so as not to come into contact with the heat exchanger,
  when air containing oil mist is supplied to the heat exchanger via the filter, at least a part of an oil component in the air containing oil mist being trapped by the filter,
  the refrigeration apparatus further comprising an oil reservoir disposed below the heat exchanger when viewed in a direction perpendicular to an air flow direction through the filter, the oil reservoir being configured to collect the oil component trapped by the filter, and
  the attachment frame including a lower frame portion disposed below the filter when viewed in the direction perpendicular to the air flow direction, the lower frame portion including an inclined portion inclined toward a heat exchanger side and downward, the inclined portion being disposed below the filter when viewed in the direction perpendicular to the air flow direction, the inclined portion being longer than the filter in a direction parallel to the air flow direction, an upper end of the inclined portion being positioned below a lower end of the filter.

2. The refrigeration apparatus according to claim 1, further comprising:
one of
an oil receiver and the oil reservoir separate from the oil receiver, the oil reservoir being disposed below a space between the heat exchanger and the filter, or
the oil receiver and the oil reservoir integrally formed on the oil receiver, the oil reservoir being disposed below the space between the heat exchanger and the filter.

3. The refrigeration apparatus according to claim 2, wherein
in a case in which the oil receiver and the oil reservoir separate from the oil receiver are included, the refrigeration apparatus includes a guide path arranged to guide oil from the oil receiver to the oil reservoir.

4. The refrigeration apparatus according to claim 1, wherein
the heat exchanger includes a plurality of plate-shaped fins disposed in parallel to each other and along a vertical direction.

5. The refrigeration apparatus according to claim 1, wherein
the filter is configured to guide oil droplets adhering to a surface of the filter downward.

6. The refrigeration apparatus according to claim 1, wherein
the filter has a filter material bent in a bellows shape.

7. The refrigeration apparatus according to claim 6, wherein
the filter is attached to the suction port of the housing such that creases of the filter material are directed in the vertical direction.

8. The refrigeration apparatus according to claim 1, wherein
the filter is attached at an interval from the heat exchanger.

9. The refrigeration apparatus according to claim 1, wherein
the refrigerator apparatus is used by an oil cooling apparatus,
the heat exchanger is a first heat exchanger functioning as a condenser,
the refrigerant circuit of the refrigeration apparatus further comprises a second heat exchanger functioning as an evaporator, and
oil is cooled by the second heat exchanger.

10. The refrigeration apparatus according to claim 1, wherein
in a section taken along a horizontal plane, the filter has a first end and a second end closer to the heat exchanger than the first end, and a first distance between the second end and the heat exchanger is shorter than a second distance between the first end and the second end.

11. The refrigeration apparatus according to claim 1, wherein
the heat exchanger includes a lower end disposed below the lower end of the filter.

12. The refrigeration apparatus according to claim 1, wherein
in a horizontal direction, the inclined portion is longer than the filter.

* * * * *